(12) United States Patent
Lim

(10) Patent No.: US 10,450,034 B2
(45) Date of Patent: Oct. 22, 2019

(54) BICYCLE OPERATING DEVICE

(71) Applicant: SHIMANO (SINGAPORE) PTE. LTD., Jurong Town (SG)

(72) Inventor: Guang Sheng Elson Lim, Singapore (SG)

(73) Assignee: SHIMANO (SINGAPORE) PTE. LTD., Jurong Town (SG)

( * ) Notice: Subject to any disclaimer, the term of this patent is extended or adjusted under 35 U.S.C. 154(b) by 783 days.

(21) Appl. No.: 14/050,821

(22) Filed: Oct. 10, 2013

(65) Prior Publication Data

US 2015/0101445 A1   Apr. 16, 2015

(51) Int. Cl.
*B62M 25/04* (2006.01)
*G05G 1/04* (2006.01)

(52) U.S. Cl.
CPC .............. *B62M 25/04* (2013.01); *G05G 1/04* (2013.01); *Y10T 74/20396* (2015.01); *Y10T 74/20438* (2015.01)

(58) Field of Classification Search
CPC ......... Y10T 74/20438; Y10T 74/20444; Y10T 74/2045; Y10T 74/20456; Y10T 74/20462; Y10T 74/20396; Y10T 74/20402; Y10T 74/2042; Y10T 74/20408; B62L 3/02; B62L 3/026; B62M 25/04; B62M 25/045; B62K 23/06; G05G 1/04
See application file for complete search history.

(56) References Cited

U.S. PATENT DOCUMENTS

| | | | | |
|---|---|---|---|---|
| 5,186,072 A | * | 2/1993 | Nagano | B62M 25/04 74/489 |
| 7,526,979 B2 | * | 5/2009 | Tsumiyama | B62K 23/06 74/502.2 |
| 2007/0245847 A1 | * | 10/2007 | Chen | B62K 23/06 74/502.2 |
| 2008/0314185 A1 | * | 12/2008 | Miki | B62K 23/06 74/473.14 |

FOREIGN PATENT DOCUMENTS

CN         201380944 Y    1/2010

* cited by examiner

*Primary Examiner* — Thomas C Diaz
(74) *Attorney, Agent, or Firm* — Global IP Counselors, LLP

(57) ABSTRACT

A bicycle operating device has a base member, a holding member, a stopping member and a positioning member. The holding member is movable between a rest position and an operated position. The stopping member is movable in a first direction. The stopping member engages the holding member to prevent movement of the stopping member in the first direction while the holding member is in the operated position. The positioning member is movable relative to the base member in the first direction. The positioning member engages the holding member to prevent movement of the positioning member in the first direction while the holding member is in the rest position. The positioning member moves relative to the stopping member in the first direction while the holding member is in the operated position.

18 Claims, 12 Drawing Sheets

BICYCLE OPERATING DEVICE

BACKGROUND

Field of the Invention

This invention generally relates to a bicycle operating device. More specifically, the present invention relates to a bicycle operating device having an operating member that is movably mounted with respect to a fixed member to rotate a cable takeup member.

Background Information

Bicycles are often provided with one or more bicycle operating devices for controlling various components of the bicycle. Some bicycles are provided with a drive train having multiple gears that allows the rider to select a particular gear for a particular situation. A bicycle operating device is usually provided for the rider to manually change gears of the drive train. This type of operating devices is often called a bicycle shifter, and is used to operate a gear changing device (e.g., a derailleur or an internal hub gear mechanism) to select a desired gear ratio.

SUMMARY

Generally, the present disclosure is directed to various features of a bicycle operating device. As disclosed herein, a bicycle operating device can be provided with an instant release feature or a reduced shock release feature.

In view of the state of the known technology and in accordance with a first aspect of the present disclosure, a bicycle operating device is provided that basically comprises a base member, a holding member, a stopping member and a positioning member. The holding member is configured to be movable relative to the base member between a rest position and an operated position. The stopping member is configured to be movable relative to the base member in a first direction. The stopping member is configured to engage the holding member so that movement of the stopping member in the first direction is prevented while the holding member is in the operated position. The positioning member is configured to be movable relative to the base member in the first direction. The positioning member is configured to engage the holding member so that movement of the positioning member in the first direction is prevented while the holding member is in the rest position. The positioning member is configured to move relative to the stopping member in the first direction while the holding member is in the operated position.

In accordance with a second aspect of the present invention, the bicycle operating device according to the first aspect further comprises a first biasing element biasing the stopping member with respect to the positioning member in the first direction.

In accordance with a third aspect of the present invention, the bicycle operating device according to the second aspect further comprises a second biasing element biasing the positioning member with respect to the base member in the first direction.

In accordance with a fourth aspect of the present invention, the bicycle operating device according to the third aspect is configured so that the second biasing element having a higher biasing force than the first biasing element.

In accordance with a fifth aspect of the present invention, the bicycle operating device according to the first aspect is configured so that the positioning member includes a plurality of positioning teeth, the stopping member includes a plurality of stopping teeth, and the holding member includes a first tooth that one of engages the positioning teeth while the holding member is in the rest position and a second tooth that engages one of the stopping teeth while the holding member is in the operated position.

In accordance with a sixth aspect of the present invention, the bicycle operating device according to the first aspect is configured so that the positioning member and the stopping member are rotatably mounted on a first axis relative to the base member to move in a rotational direction that corresponds to the first direction.

In accordance with a seventh aspect of the present invention, the bicycle operating device according to the sixth aspect is configured so that the positioning member includes a plurality of positioning teeth, the stopping member includes a plurality of stopping teeth, and the holding member includes a first tooth that engages one of the positioning teeth while the holding member is in the rest position and a second tooth that engages one of the stopping teeth while the holding member is in the operated position, the first tooth and the second tooth being offset from each other in an axial direction of the first axis.

In accordance with an eighth aspect of the present invention, the bicycle operating device according to the sixth aspect further comprises a first biasing element biasing the stopping member with respect to the positioning member in the first direction.

In accordance with a ninth aspect of the present invention, the bicycle operating device according to the eighth aspect further comprises a second biasing element biasing the positioning member with respect to the base member in the first direction.

In accordance with a tenth aspect of the present invention, the bicycle operating device according to the ninth aspect is configured so that the second biasing element having a higher biasing force than the first biasing element.

In accordance with an eleventh aspect of the present invention, the bicycle operating device according to the eighth aspect is configured so that the first biasing element is a torsion spring having a coiled portion disposed around the first axis, and located between the positioning member and the stopping member in an axial direction of the first axis.

In accordance with a twelfth aspect of the present invention, the bicycle operating device according to the first aspect further comprises a wire takeup member that is fixed to the positioning member, wherein the positioning member, the wire takeup member and the stopping member are rotatably mounted on a first axis relative to the base member to move in a rotational direction that corresponds to the first direction.

In accordance with a thirteenth aspect of the present invention, the bicycle operating device according to the twelfth aspect is configured so that the stopping member is movably mounted on the wire takeup member to rotate with respect to wire takeup member and the positioning member about the first axis.

In accordance with a fourteenth aspect of the present invention, the bicycle operating device according to the first aspect is configured so that the holding member is configured to pivot about a second axis, and is biased to the rest position.

In accordance with a fifteenth aspect of the present invention, the bicycle operating device according to the first aspect further comprises a first operating member that is operatively coupled to the holding member to move the holding member from the rest position to the operated position in response to movement of the first operating member with respect to the base member.

In accordance with a sixteenth aspect of the present invention, the bicycle operating device according to the fifteenth aspect further comprises a second operating member that is operatively coupled to the positioning member to move the positioning member in a second direction, which is opposite the first direction.

In accordance with a seventeenth aspect of the present invention, the bicycle operating device according to the sixteenth aspect is configured so that the positioning member includes a plurality of pulling teeth, and the second operating member includes a pulling pawl that engages one of the pulling teeth and moves the positioning member in the second direction in response to movement of the second operating member.

In accordance with an eighteenth aspect of the present invention, the bicycle operating device according to the first aspect further comprises an absorber that is disposed between the positioning member and the stopping member to absorb an impact shock and noise of the stopping member occurring by the positioning member moving relative to the stopping member in the first direction as a result of the holding member being moved from the rest position to the operated position.

Also other objects, features, aspects and advantages of the disclosed bicycle operating device will become apparent to those skilled in the art from the following detailed description, which, taken in conjunction with the annexed drawings, discloses preferred embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
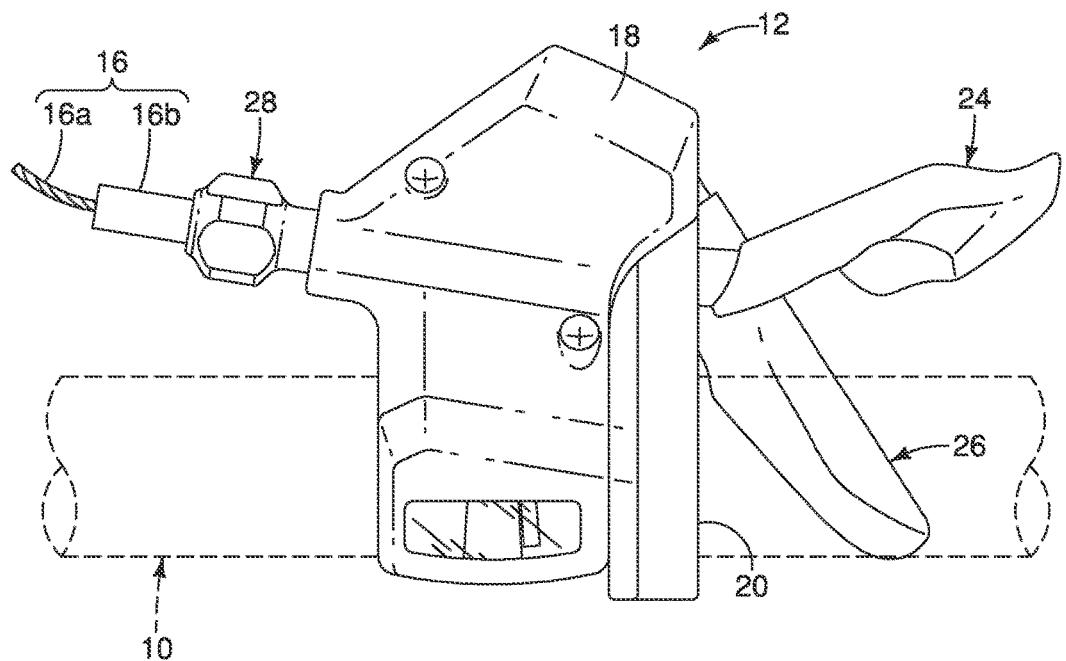
FIG. 1 is a top plan view of a bicycle operating device in accordance with a first embodiment.

Referring initially to FIG. 1, a portion of a bicycle handlebar 10 is illustrated that is provided with a bicycle operating device 12 in accordance with a first illustrated embodiment. The bicycle operating device 12 is configured to be mounted on a right side of the bicycle handlebar 10. In the first illustrated embodiment, the bicycle operating device 12 is operatively coupled to one of gear changing devices (not shown) via a control cable 16. For example, the bicycle operating device 12 is connected by the control cable 16 to a nine-speed rear derailleur or internal hub gear mechanism.

Preferably, as seen in FIG. 1, the control cable 16 is conventional bicycle operating cables that have an outer case covering an inner cable. In other words, each of the control cable 16 is a Bowden type cable that basically includes an inner cable slidably received within an outer case. For example, the control cable 16 has an inner cable 16a with an outer case 16b covering the inner cable 16a. Gear changing devices are part of a conventional bicycle driving system that is used to select a desired gear ratio of a drive train (not shown) in a relatively conventional manner. Thus, a gear changing device will not be shown or described herein. However, the bicycle operating device 12 could be used for operating other types of bicycle components (e.g., suspension devices) as needed and/or desired.

Figure 2:
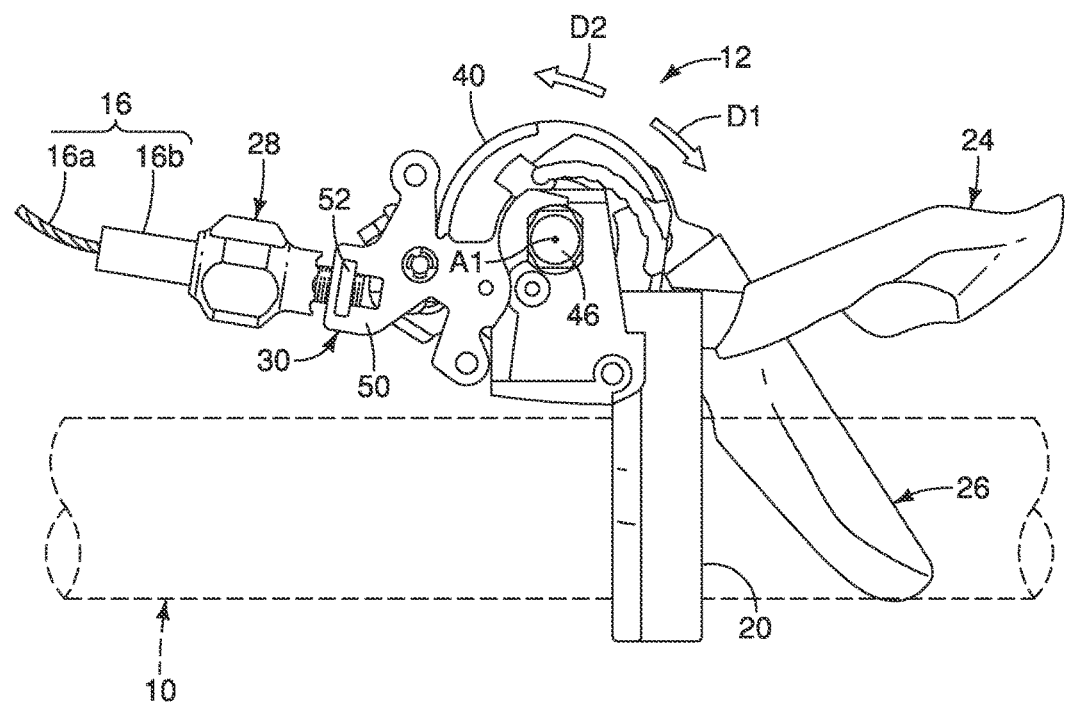
FIG. 2 is a top plan view of the bicycle operating device illustrated in FIG. 1 with the housing and the gear indicator removed to show certain internal parts of the cable position maintaining arrangement for the bicycle operating device in accordance with the first embodiment.
Figure 3:
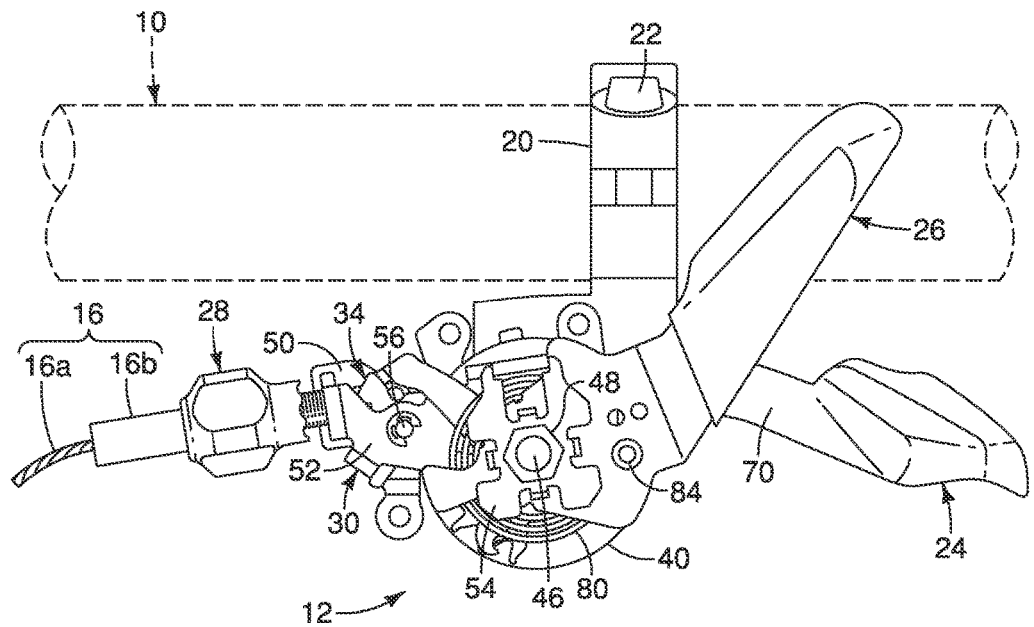
FIG. 3 is a bottom plan view of the bicycle operating device illustrated in FIG. 2 in which the first and second operating members are in rest positions.
Figure 4:
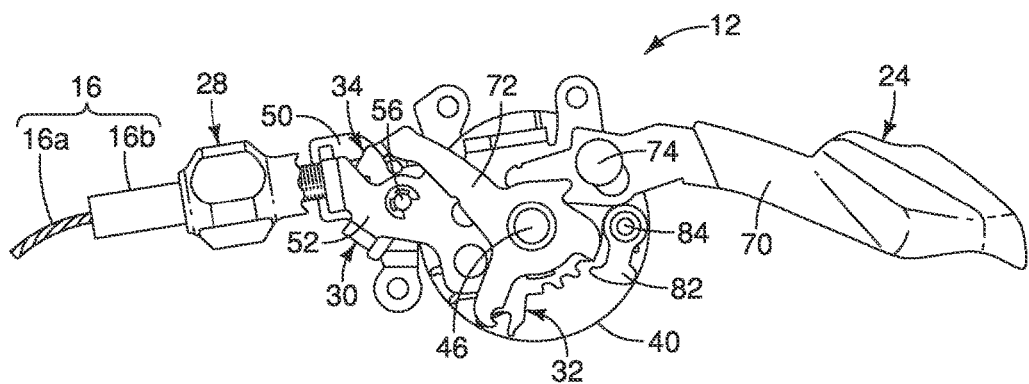
FIG. 4 is another bottom plan view of selected parts relating to a cable position maintaining arrangement of the bicycle operating device in accordance with the first embodiment in which the first operating member is in the rest position and the wire takeup member is maintained in one of the predetermined holding positions.

As seen in FIG. 1, the bicycle operating device 12 comprises a housing 18 and a bicycle mounting member 20. The housing 18 is fixed to the mounting member 20 and covers the internal parts of the bicycle operating device 12. Here, the housing 18 has a two-piece construction that is fastened together. However, the housing 18 can have a variety of configurations as needed and/or desired. The bicycle mounting member 20 is configured to be attached to a part of a bicycle such as, for example, the handlebar 10 as seen in FIGS. 1 to 3. Thus, the bicycle mounting member 20 constitutes an example of a handlebar mounting member. Here, the bicycle mounting member 20 is a tube clamp that includes a tightening bolt 22 or other tightening member that is configured to squeeze the bicycle mounting member 20 onto the handlebar 10.

In the illustrated embodiment, the bicycle operating device 12 further comprises a first operating member 24 and a second operating member 26. Preferably, a cable adjusting unit 28 is mounted to the housing 18 in a conventional manner. The first and second operating members 24 and 26 are preferably trigger levers that automatically return to their rest or home position after being operated and then released by the user. In any case, the first and second operating members 24 and 26 are used to pull and release the inner cable 16a from the housing 18 in response to operation of the first and second operating members 24 and 26 as discussed below.

In the case of the bicycle operating device 12 being used as a shifting device, the first and second operating members 24 and 26 constitutes shift members or shift levers. The first operating member 24 constitutes a release member that is in the form of a release lever for releasing the inner cable 16a from the housing 18 in response to operation of the first operating member 24. In particular, the first operating member 24 releases the inner cable 16a as the first operating member 24 is moved by the user from a rest position to an operated position as explained later. On the other hand, the second operating member 26 constitutes a pulling member that is in the form of a pulling lever for pulling the inner cable 16a into the housing 18 in response to operation of the second operating member 26. In particular, the second operating member 26 pulls the inner cable 16a as the second operating member 26 is moved by the user from a rest position to an operated position as explained later.

Figure 5:
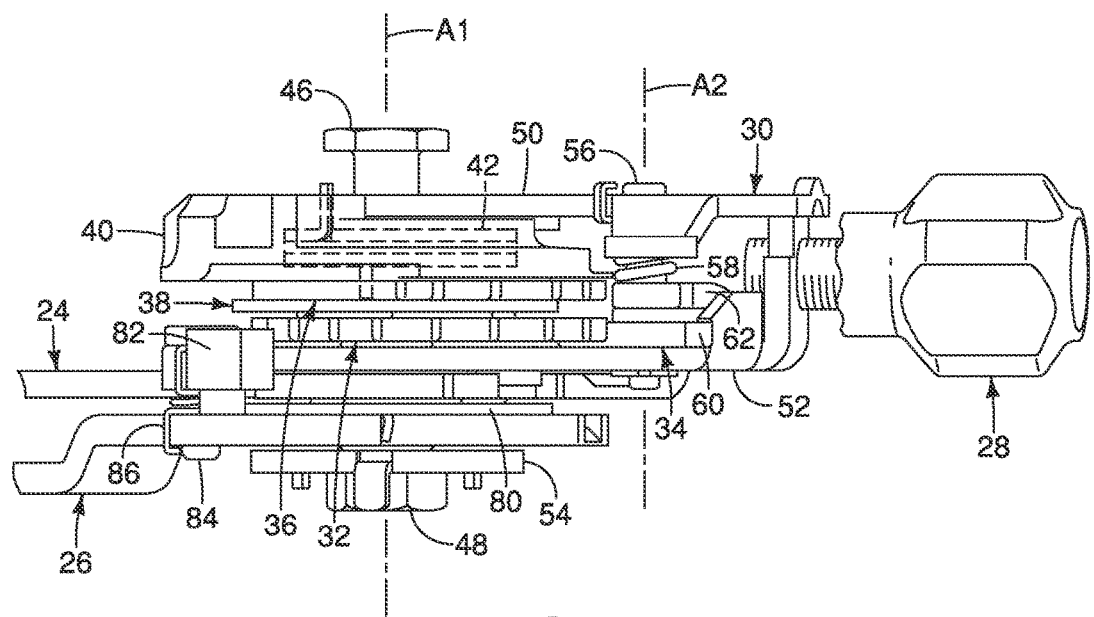
FIG. 5 is a partial side elevational view of selected parts of the bicycle operating device in accordance with the first embodiment.

Referring now to FIGS. 2 to 5, a cable position maintaining arrangement of the bicycle operating device 12 will now be discussed. The cable position maintaining arrangement is used for holding the inner cable 16a while the first and second operating members 24 and 26 are in their rest positions. The cable position maintaining arrangement of the bicycle operating device 12 basically comprises a base member 30, a positioning member 32, a holding member 34 and a stopping member 36. Preferably, the cable position maintaining arrangement of bicycle operating device 12 further comprises a first biasing element 38 for biasing the stopping member 36 with respect to the positioning member 32 in a first direction D1. Also preferably, the bicycle operating device 12 further comprises a wire takeup member 40 that is fixed to the positioning member 32 so that the positioning member 32 and the wire takeup member 40 move together as a unit with respect to the base member 30. In the illustrated embodiment, as seen in FIG. 5, the bicycle operating device 12 further preferably comprises a second biasing element 42 (shown in broken lines) for biasing the positioning member 32 with respect to the base member 30 in the first direction D1. The second biasing element 42 has a higher biasing force than the first biasing element 38.

Basically, this cable position maintaining arrangement controls the position of the wire takeup member 40 in response to operation of the first and second operating members 24 and 26. In other words, the cable position maintaining arrangement selectively maintains the wire takeup member 40 in any one of a plurality of predetermined holding positions relative to the housing 18 and the base member 30. More particularly, the base member 30 is fixedly coupled to the bicycle. The base member 30 movably supports the positioning member 32, the holding member 34 and the stopping member 36 for movement in response to operation of the first and second operating members 24 and 26. The movements of the positioning member 32, the holding member 34 and the stopping member 36 will be discussed later.

Also as explained later, the holding member 34 is configured to be movable relative to the base member 30 between a rest position and an operated position. The positioning member 32 is configured to engage the holding member 34 so that movement of the positioning member 32 and the wire takeup member 40 in the first direction D1 is prevented while the holding member 34 is in the rest position. Stated differently and as explained below, the holding member 34 is configured to engage the positioning member 32 while the holding member 34 is in the rest position to selectively maintain the positioning member 32 and the wire takeup member 40 in any one of the predetermined holding positions. Thus, the inner cable 16a is held at different positions with respect to the base member 30 in accordance with these predetermined holding positions of the positioning member 32 and the wire takeup member 40.

The second operating member 26 is operatively coupled to the positioning member 32 to rotate the positioning member 32 in a second direction D2, which is opposite the first direction D1. The positioning member 32 is configured to be movable relative to the base member 30 in the first direction D1 and to be movable relative to the stopping member 36 in the first direction D1 within a prescribed range R (FIG. 14) therebetween. The positioning member 32 is configured to move relative to the stopping member 36 in the first direction D1 within the prescribed range R while the holding member 34 is in the operated position. In other words, the stopping member 36 is configured to move relative to the wire takeup member 40 within the prescribed range R while the holding member 34 is in the operated position.

Figure 10:
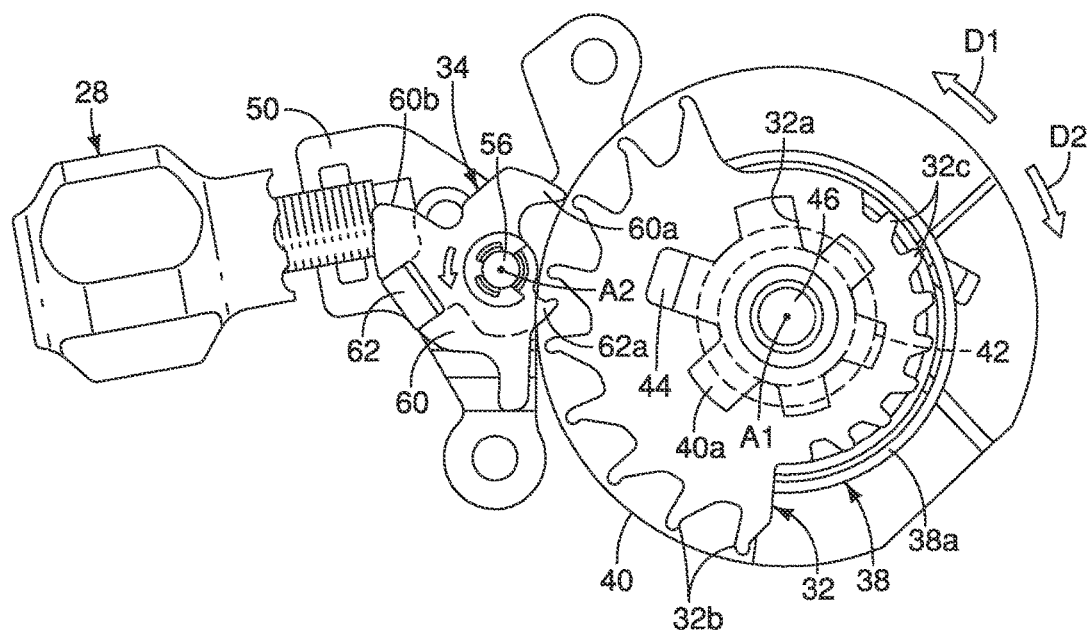
FIG. 10 is an enlarged bottom plan view of some of the parts relating to the cable position maintaining arrangement of the bicycle operating device illustrated in FIG. 9 in which the first tooth of the holding member is disengaged from the positioning member to release the wire takeup member and a second tooth of the holding member has been moved into the path of the stopping teeth of the stopping member, which are currently aligned with the positioning teeth of the positioning member.

During a cable releasing operation, the holding member 34 moves relative to the base member 30 from the rest position (FIG. 8) to the operated position (FIG. 10). As a result of this movement of the holding member 34, the positioning member 32 and the stopping member 36 are initially released to move in the first direction D1. With the holding member 34 in the operated position, the holding member 34 will engage the stopping member 36 to stop the movement of the stopping member 36 in the first direction D1. However, the positioning member 32 will continue to move in the first direction D1 with respect to the stopping member 36 by a prescribed range R about the first axis A1 due to the biasing force of the second biasing element 42, which is higher than the biasing force of the first biasing element 38. Once the holding member 34 moves from the operated position back to the rest position, the holding member 34 reengages the positioning member 32 to hold the positioning member 32 in a new one of the predetermined holding positions. Also, this movement of the holding member 34 from the operated position back to the rest position results in the stopping member 36 moving in the first direction D1 due to the biasing force of the first biasing element 38. In this way, an instant release can be achieved by selecting a light spring member for the first biasing element 38.

Preferably, the bicycle operating device 12 further comprises an absorber 44 (FIG. 6) that is disposed between the positioning member 32 and the stopping member 36 to absorb an impact shock and noise of the stopping member 36 occurring by the positioning member 32 moving relative to the stopping member 36 in the first direction D1 as a result of the holding member 34 being moved from the rest position to the operated position. The absorber 44 is made of a slightly compressible resilient material such as a relatively hard elastomer (rubber).

As seen in FIGS. 2 and 3, in the illustrated embodiment, a bolt 46 and a nut 48 are provided to attach the bicycle mounting member 20 to the base member 30. The nut 48 is screwed onto a threaded end of the bolt 46 for securing the bicycle mounting member 20 to the base member 30. The bolt 46 constitutes a first axle that defines a first axis A1. The positioning member 32, the wire takeup member 40 and the stopping member 36 are rotatably mounted on the first axis A1 relative to the base member 30 to move in a first rotational direction that corresponds to the first direction D1 and to move in a second rotational direction that corresponds to a second direction D2, which is opposite the first direction D1.

The inner cable 16a is attached to the wire takeup member 40 such that rotation of the wire takeup member 40 about the first axis A1 causes the inner cable 16a to be either released or pulled with respect to the base member 30. More specifically, the rotation (movement) of the wire takeup member 40 about the first axis A1 in the first (rotational) direction D1 causes the inner cable 16a to be released, while the rotation (movement) of the wire takeup member 40 about the first axis A1 in the second (rotational) direction D2 causes the inner cable 16a to be pulled.

As seen in FIG. 5, in the illustrated embodiment, the base member 30 basically includes a first stationary support plate 50, a second stationary support plate 52 and a third stationary support plate 54. The bolt 46 extends through the stationary support plates 50, 52 and 54 and a portion of the bicycle mounting member 20. Once the nut 48 is tighten onto the bolt 46, the stationary support plates 50, 52 and 54 are secured together as a unit on the bicycle mounting member 20. A pivot pin 56 is mounted between the first and second stationary support plates 50 and 52 for pivotally supporting the holding member 34 on the base member 30. The pivot pin 56 constitutes a pivot axle that defines a second axis A2. Thus, the holding member 34 is configured to pivot about the second axis A2. The holding member 34 is biased to the rest position by a third biasing element 58.

Figure 6:
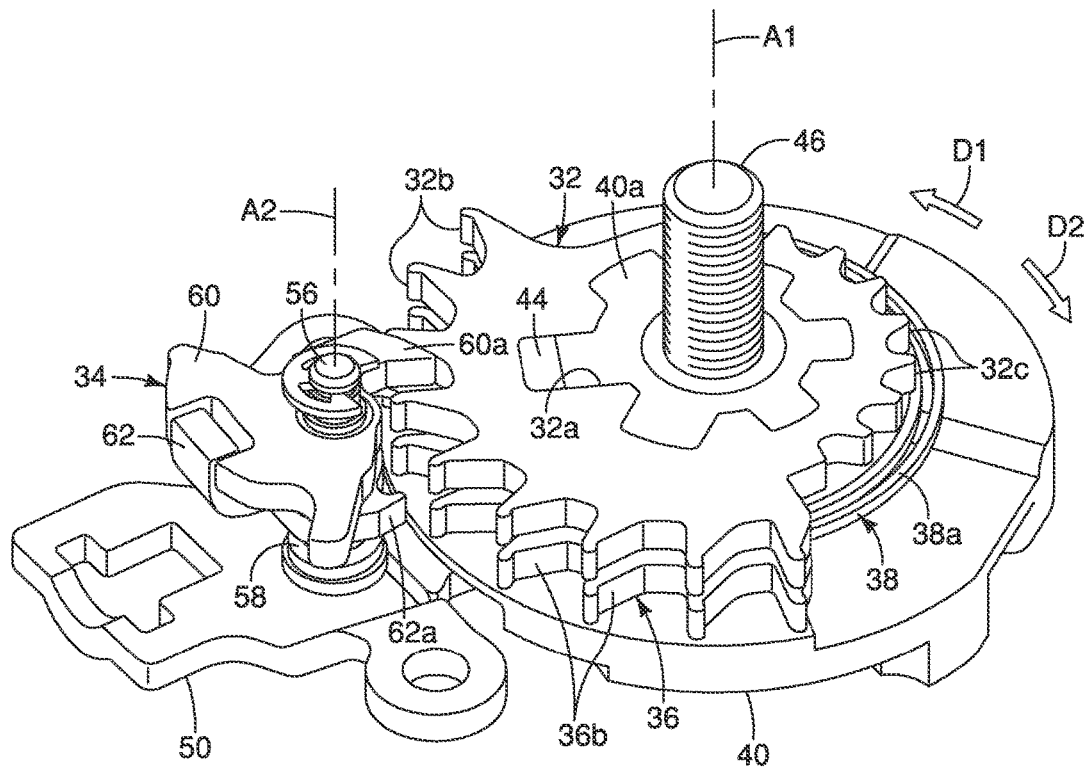
FIG. 6 is an enlarged perspective view of selected parts of the cable position maintaining arrangement of the bicycle operating device in accordance with the first embodiment.

Now, the positioning member 32 will be discussed in more detail. In the illustrated embodiment, the positioning member 32 is a flat positioning plate that is formed from a rigid material such as a metallic material. As seen in FIG. 6, the positioning member 32 has a non-circular opening 32a for receiving a projection 40a of the wire takeup member 40. Here in the illustrated embodiment, the projection 40a mates with the non-circular opening 32a to normally prevent relative rotation of the positioning member 32 with respect to the wire takeup member 40. The positioning member 32 includes a plurality of positioning teeth 32b. The positioning member 32 also includes a plurality of pulling teeth 32c. The positioning teeth 32b and the pulling teeth 32c are formed on a peripheral edge of the positioning member 32.

Now, the stopping member 36 will be discussed in more detail. In the illustrated embodiment, the stopping member 36 is a flat stopping plate that is formed from a rigid material such as a metallic material. The stopping member 36 is configured to be movable relative to the base member 30 in the first direction D1 and the second direction D2. The stopping member 36 is configured to engage the holding member 34 so that movement of the stopping member 36 in the first direction D1 is prevented while the holding member 34 is in the operated position.

Figure 13:
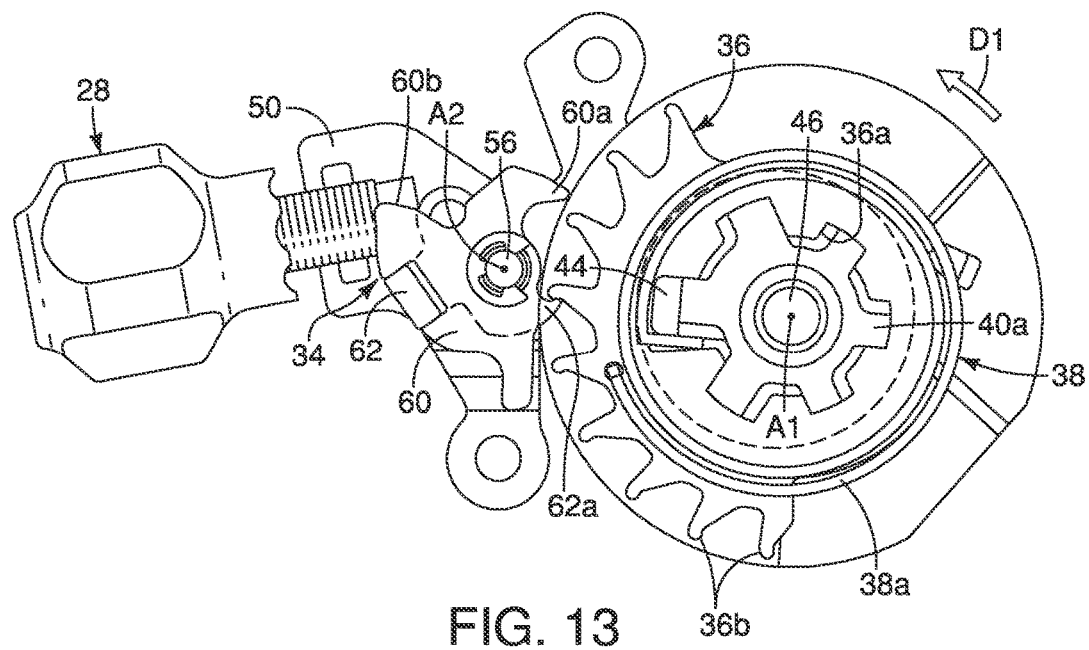
FIG. 13 is an enlarged bottom plan view, identical to FIG. 12, of the bicycle operating device, but with the positioning member removed to show the second tooth of the holding member engaging a tooth of the stopping member.

As seen in FIG. 13, the stopping member 36 has a non-circular opening 36a for receiving a projection 40a of the wire takeup member 40. Here in the illustrated embodiment, the projection 40a mates with the non-circular opening 36a such that the stopping member 36 can rotate slightly relative to the positioning member 32 and the wire takeup member 40. The stopping member 36 is connected to the positioning member 32 by the first biasing element 38 such that the stopping member 36 is biased in the first direction D1 with respect to the positioning member 32 and the wire takeup member 40.

Figure 8:
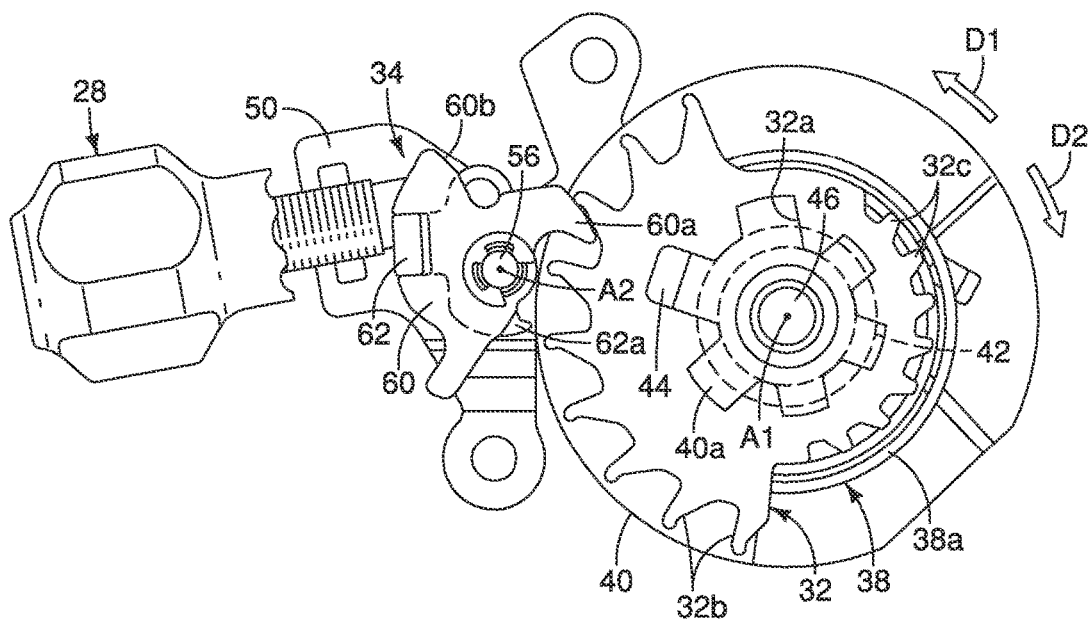
FIG. 8 is an enlarged bottom plan view of some of the parts relating to the cable position maintaining arrangement of the bicycle operating device illustrated in FIG. 6 in which the wire takeup member is maintained in one the predetermined holding positions as a result of a first tooth of the holding member engaging one of the positioning teeth of the positioning member.
Figure 14:
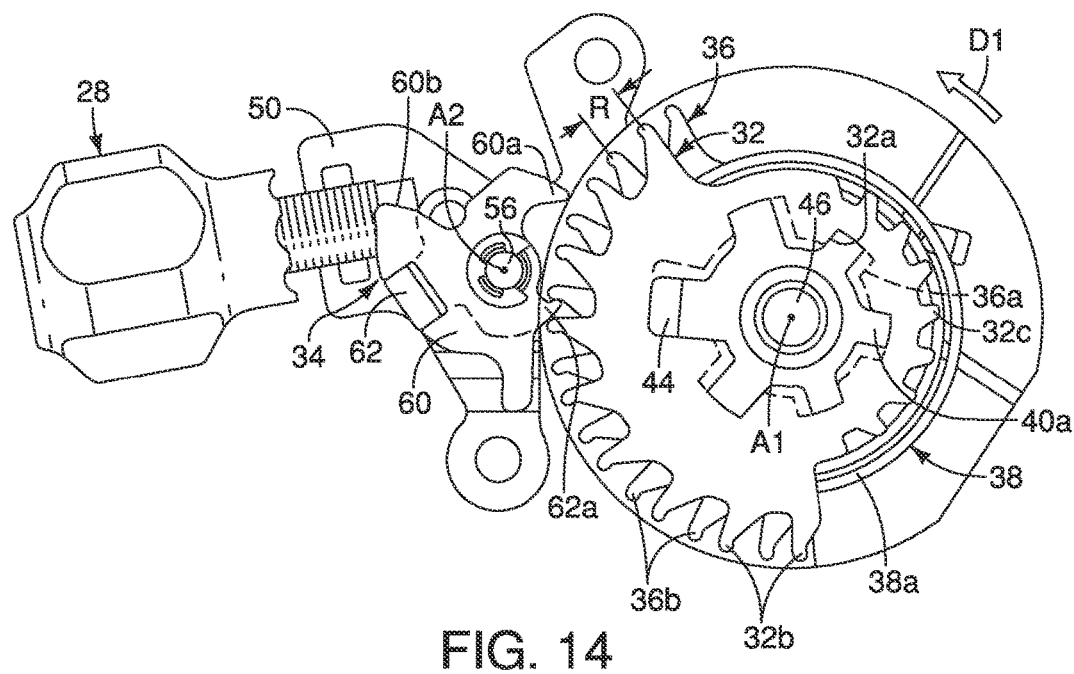
FIG. 14 is an enlarged bottom plan view of some of the parts relating to the cable position maintaining arrangement of the bicycle operating device illustrated in FIG. 11, but with the wire takeup member and the positioning member rotated further in the first direction relative to the stopping member.
Figure 15:
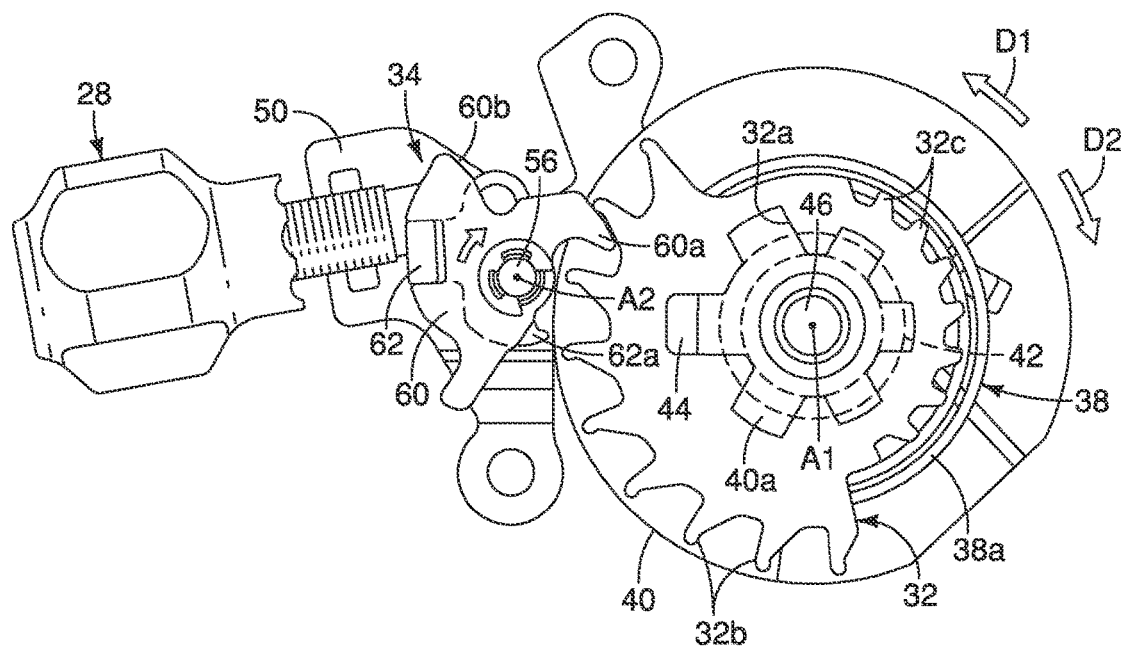
FIG. 15 is an enlarged bottom plan view of some of the parts relating to the cable position maintaining arrangement of the bicycle operating device illustrated in FIGS. 13 and 14, but with the holding member pivoted back to the rest position such that the first tooth of the holding member engages one of the positioning teeth of the positioning member and such that the stopping member rotates back into alignment with the positioning teeth.
Figure 16:
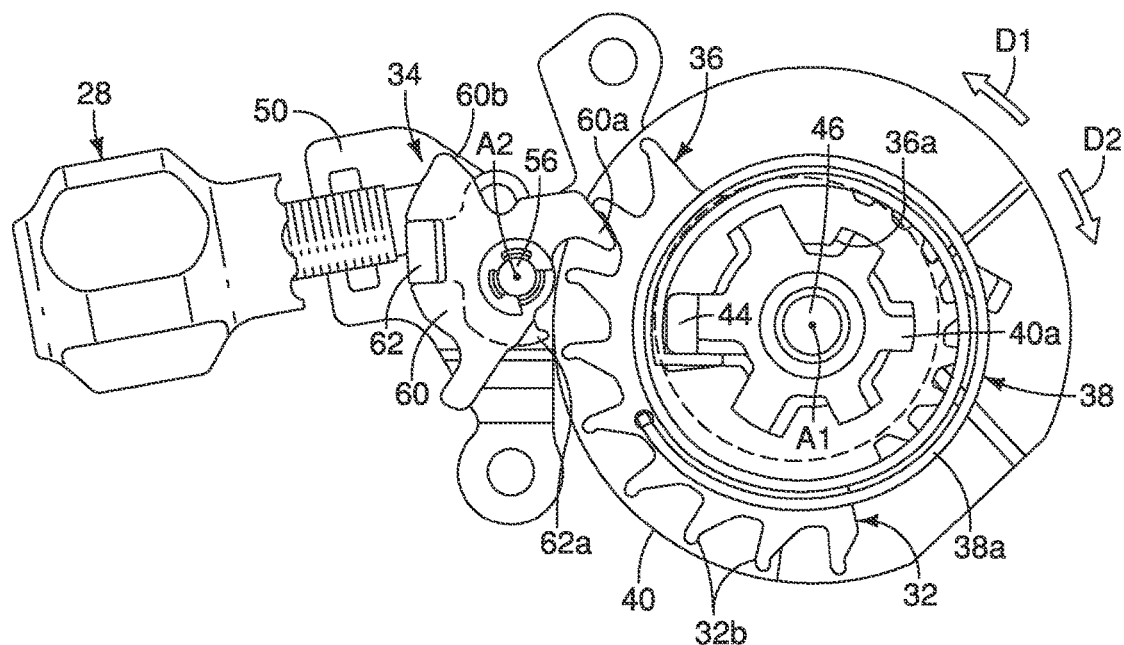
FIG. 16 is an enlarged bottom plan view, identical to FIG. 15, of the bicycle operating device, but with the positioning member removed to show the position of the stopping member.

The stopping member 36 further includes a plurality of stopping teeth 36b. The first biasing element 38 biases the stopping member 36 with respect to the positioning member 32 and the wire takeup member 40 such that the positioning teeth 32b and the stopping teeth 36b are aligned when the holding member 34 is engaged with one of the positioning teeth 32b of the positioning member 32 as seen in FIGS. 8 and 15. When the holding member 34 is engaged with one of the stopping teeth 36b of the stopping member 36, the positioning teeth 32b and the stopping teeth 36b are offset as seen in FIG. 14. In this way, the stopping member 36 is movably mounted on the wire takeup member 40 to rotate with respect to wire takeup member 40 and the positioning member 32 within the prescribed range R about the first axis A1. The positioning member 32 and the stopping member 36 are rotatably mounted on the first axis A1 relative to the base member 30 to move in a first rotational direction that corresponds to the first direction D1 during a cable releasing operation using the first operating member 24. Also the positioning member 32 and the stopping member 36 are rotatably mounted on the first axis A1 relative to the base member 30 to move in a second rotational direction that corresponds to the second direction D2 during a cable pulling operation using the second operating member 26.

Figure 17:
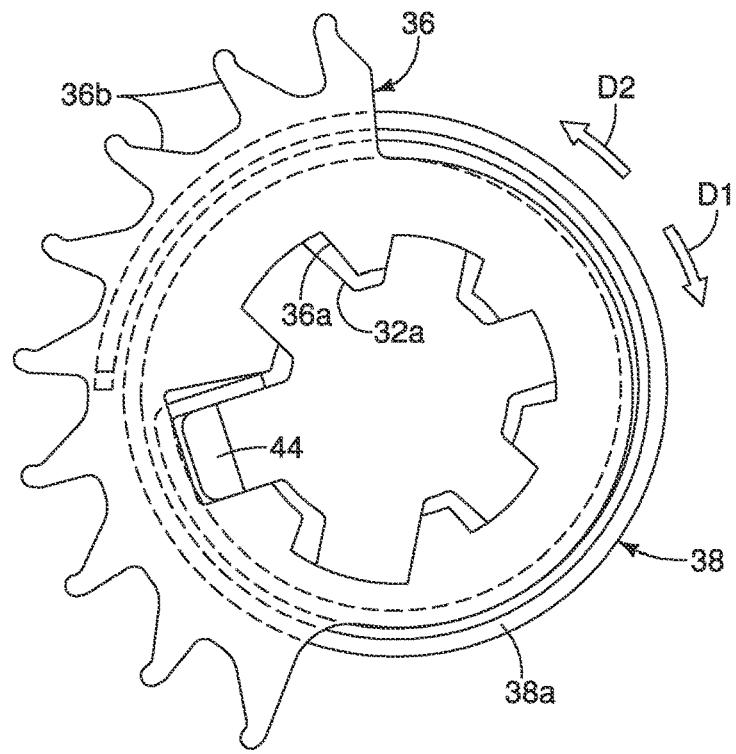
FIG. 17 is an enlarged top plan view of the positioning member, the stopping member and the first biasing element in their rest positions.
Figure 18:
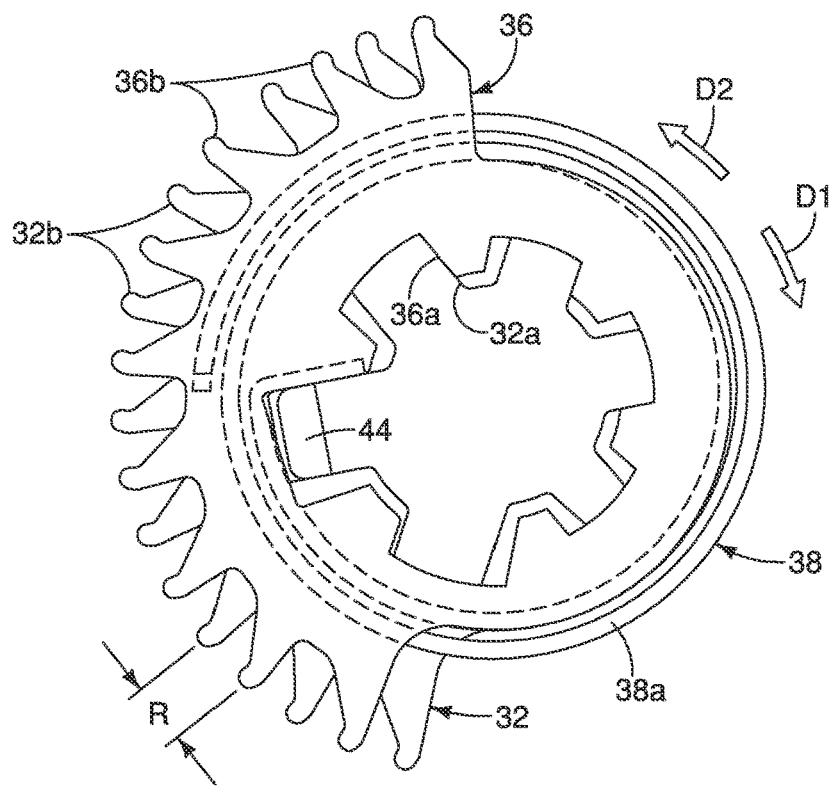
FIG. 18 is an enlarged top plan view of the positioning member, the stopping member and the first biasing element with the stopping member rotated relative to the positioning member against the biasing force of the first biasing element.

Here in the illustrated embodiment, as seen in FIG. 13, the first biasing element 38 is a torsion spring that has a coiled portion 38a disposed around the first axis A1. One end of the first biasing element 38 is disposed in a hole in the stopping member 36, while the other end of the first biasing element 38 is bent to engage the projection 40a of the wire takeup member 40, Since the positioning member 32 and the wire takeup member 40 are fixed together, the first biasing element 38 effectively biases the positioning member 32 and the stopping member 36 in opposite rotational directions with respect to the first axis A1. In other words, the positioning member 32 is biased toward the second direction D2 with respect to the stopping member 36 by the first biasing element 38 and the stopping member 36 is biased toward the first direction D1 with respect to the positioning member 32 by the first biasing element 38 when the holding member 34 is in the operated position. The first biasing element 38 is located between the positioning member 32 and the stopping member 36 in an axial direction of the first axis A1 as seen in FIGS. 5, 17 and 18.

Now, the holding member 34 will be discussed in more detail. As seen in FIG. 6, n the illustrated embodiment, the holding member 34 is formed of a first holding plate 60 and a second holding plate 62. The first holding plate 60 and the second holding plate 62 are formed from a rigid material such as a metallic material. The first holding plate 60 and the second holding plate 62 have a tab and slot arrangement such that the first holding plate 60 and the second holding plate 62 moves together as a unit without any relative movement therebetween.

As seen in FIGS. 6 to 16, the holding member 34 is configured to be movable relative to the base member 30 between the rest position and the operated position. In particular, the holding member 34 is pivotally mounted on the pivot pin 56 that is fixed between the first and second stationary support plates 50 and 52. The third biasing element 58 is provided on the pivot pin 56 for biasing the holding member 34 towards in engagement with the peripheral edge of the positioning member 32. The positioning teeth 32b cooperate with the holding member 34 to define the plurality of holding positions of the wire takeup member 40. In particular, the first holding plate 60 of the holding member 34 includes a first tooth 60a that engages the positioning teeth 32b while the holding member 34 is in the rest position. The first tooth 60a engages the positioning teeth 32b of the positioning member 32 to prevent the positioning member 32 and the stopping member 36 from rotating under the urging force of the second biasing element 42. The second holding plate 62 of the holding member 34 includes a second tooth 62a that engages one of the stopping teeth 36b while the holding member 34 is in the operated position. The first tooth 60a and the second tooth 62a are offset from each other in an axial direction of the first axis A1. By movement of the positioning member 32 prior to the stopping member 36 and shortening a distance between the positioning tooth 32b of the positioning member 32 and the first tooth 60a of the holding member 34, a shock produced during a releasing operation by the positioning tooth 32b hitting the first tooth 60a due to the biasing force of the second biasing element 42 can be reduced.

The first operating member 24 is operatively coupled to the holding member 34 to move the holding member 34 from the rest position to the operated position in response to movement of the first operating member 24 with respect to the base member 30.

The positioning member 32 is rotatably mounted on the bolt 46 to rotate with the wire takeup member 40 due to the mating configuration mentioned above. Since the positioning member 32 is non-rotatably mounted on the wire takeup member 40, the second biasing element 42 also biases the positioning member 32 in the first direction D1. In the illustrated embodiment, as seen in FIG. 5, the second biasing element 42 is a torsion spring having a coiled portion disposed around the bolt 46, a first end portion connected to the first stationary support plate 50 and a second end connected to the wire takeup member 40.

Figure 7:
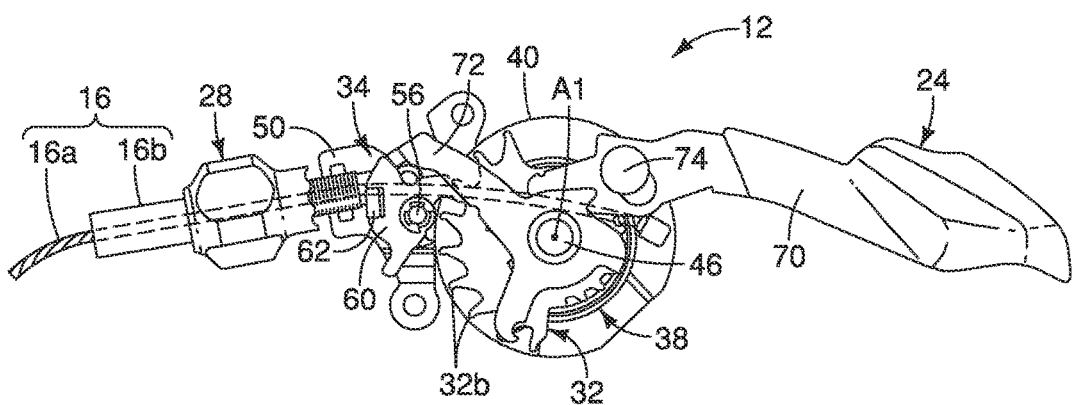
FIG. 7 is a bottom plan view of selected parts relating to the cable position maintaining arrangement of the bicycle operating device of the first embodiment in which the first operating member is in the rest position and the wire takeup member maintained is in one of the predetermined holding positions.
Figure 9:
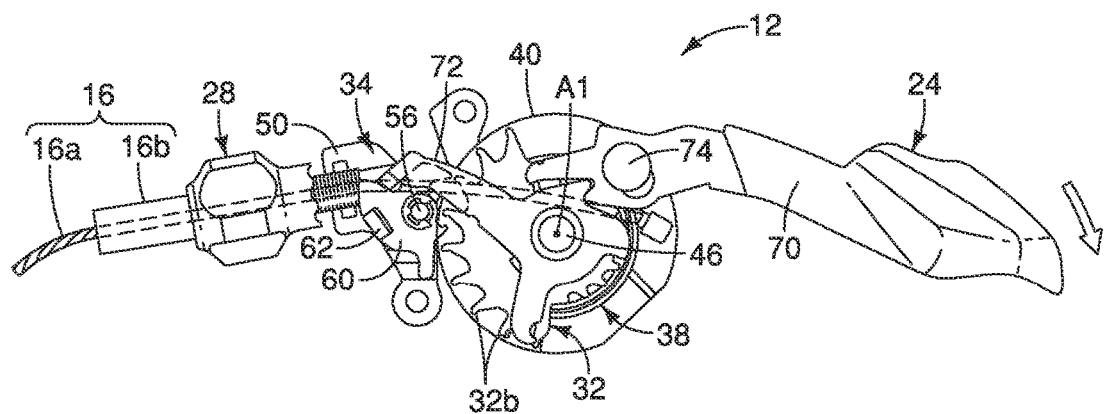
FIG. 9 is a bottom plan view of selected parts relating to the cable position maintaining arrangement of the bicycle operating device of the first embodiment in which the first operating member has been operated to perform a cable releasing operation such that the wire takeup member can rotate in a first (release) direction to one of the predetermined holding positions.
Figure 11:
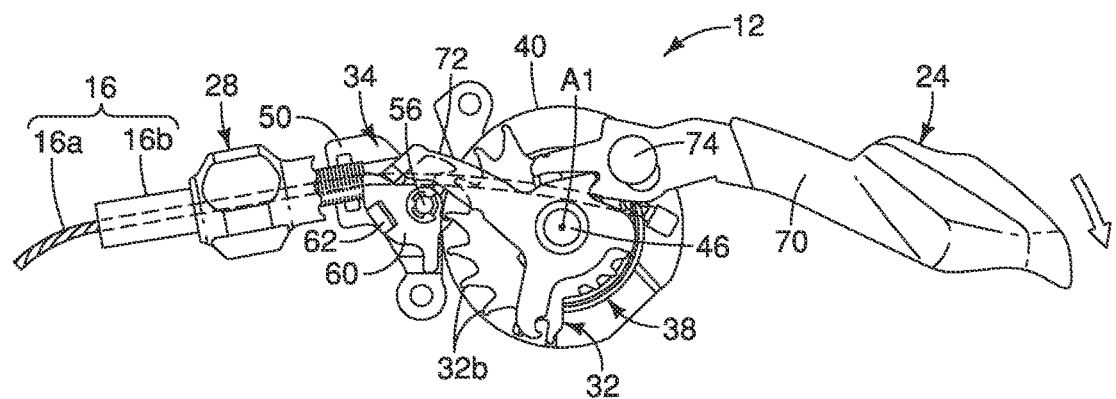
FIG. 11 is a bottom plan view of selected parts of the bicycle operating device of the first embodiment in which the wire takeup member has been rotated in the first direction from the position shown in FIGS. 7 to 10 as a result of the first tooth of the holding member being disengaged from the positioning member.
Figure 12:
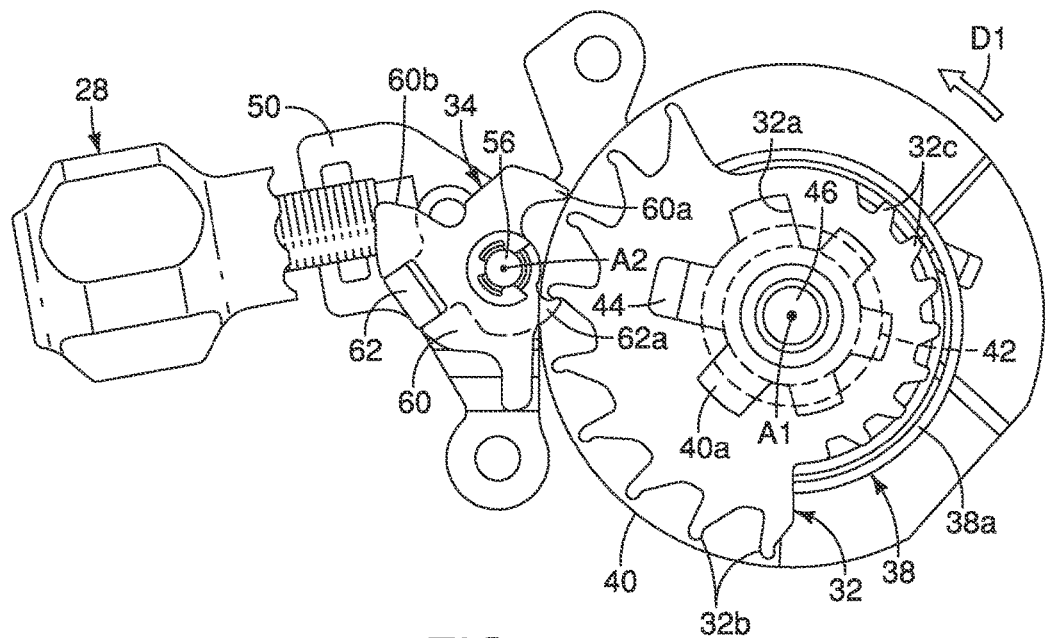
FIG. 12 is an enlarged bottom plan view of some of the parts relating to the cable position maintaining arrangement of the bicycle operating device illustrated in FIG. 11 in which the wire takeup member has been rotated in the first direction from the position shown in FIGS. 7 to 10 as a result of the first tooth of the holding member being disengaged from the positioning member.

Referring to FIGS. 7, 9 and 11, in the illustrated embodiment, the first operating member 24 releases the wire takeup member 40 such that the second biasing element 42 (i.e., a torsion spring) rotates the wire takeup member 40 in the first direction D as the first operating member 24 is moved by the user from the rest position (FIG. 7) to the operated position (FIGS. 9 and 11). On the other hand, referring to FIGS. 19 and 20, in the illustrated embodiment, the second operating member 26 rotates the wire takeup member 40 in the second direction D2 as the second operating member 26 is moved by the user from the rest position (FIG. 19) to the operated position (FIG. 20).

Referring primarily to FIGS. 4, 7, 9 and 11, the first operating member 24 will be discussed in more detail. Here in the illustrated embodiment, the first operating member 24 includes a user operating part 70 and an internal operated part 72 such that the first operating member 24 can be operated in either direction from the rest position to perform a releasing operation. The user operating part 70 is pivotally attached to the second stationary support plate 52 by a pivot pin 74, The internal operated part 72 is pivotally mounted on the bolt 46 to pivot about the first axis A1. The user operating part 70 is interlocked with the internal operated part 72 as seen in FIGS. 4, 7, 9 and 11. In other words, the user operating part 70 and the internal operated part 72 pivot together as a unit about the first axis A1 as the user operating part 70 is operated in the first direction D1. When the user operating part 70 is pivoted in the second direction D2, the user operating part 70 pivots on a pivot pin 74, and the internal operated part 72 pivots about the first axis A1 in the first direction D1 as seen in FIG. 9. In particular, the pivot pin 74 extends through a slot in the user operating part 70 to prevent the user operating part 70 from separating from the internal operated part 72. With this configuration, the user operating part 70 can pivot in either direction to pivot internal operated part 72 in the first direction D1. Of course, the user operating part 70 and the internal operated part 72 can be formed as a single piece if it is desirable for the first operating member 24 to be operated only in the first direction D1.

The internal operated part 72 is configured as a release member that selectively engages an abutment 60b of the first holding plate 60 to pivots the holding member 34 as the first operating member 24 is pivoted from the rest position to the operated position. As a result of this pivoting of the internal operated part 72, the first tooth 60a disengages from one of the positioning teeth 32b of the positioning member 32 to allow rotation of the wire takeup member 40 and the positioning member 32 in the first direction AD1 (see, FIGS. 9 to 12). At the same time, the second tooth 62a moves into the path of the positioning teeth 32b of the positioning member 32 and the stopping teeth 36b of the stopping member 36. As a result, the second tooth 62a abuts one of the stopping teeth 36b and stops the rotation of the wire takeup member 40 and the positioning member 32 in the first direction D1.

Figure 19:
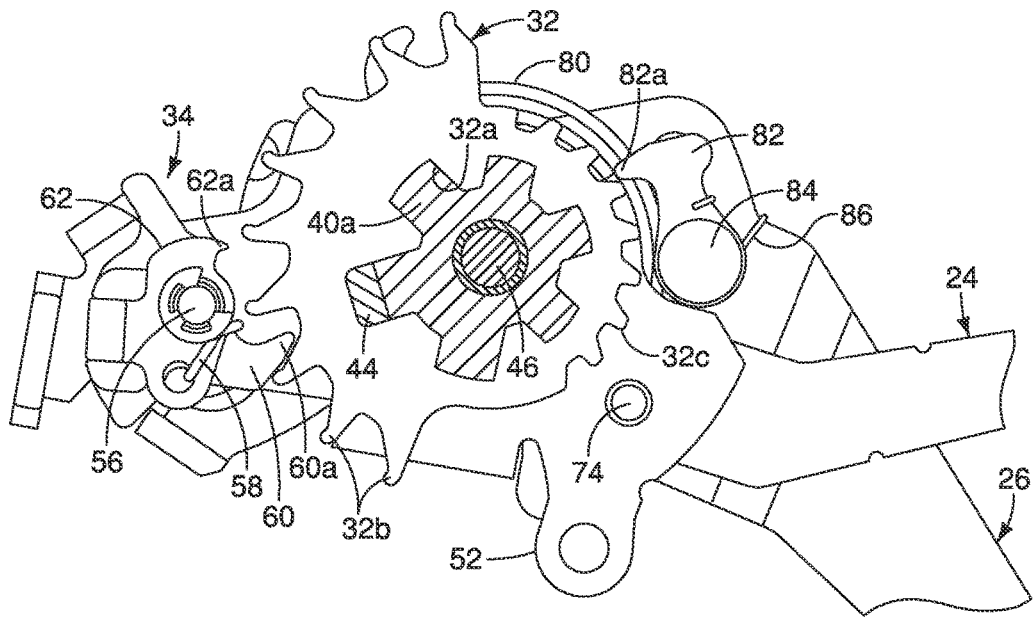
FIG. 19 is a top plan view of selected part relating to a pulling operation of the bicycle operating device of the first embodiment in which each of the first and second operating members is in the rest position.
Figure 20:
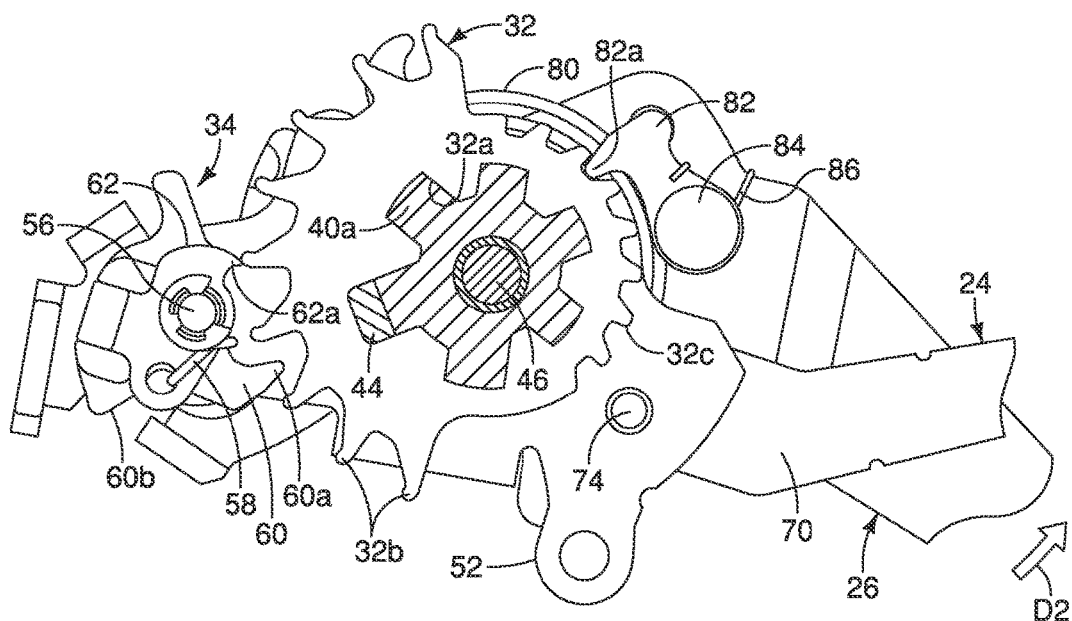
FIG. 20 is a top plan view, similar to FIG. 19, of selected part relating to a pulling operation of the bicycle operating device of the first embodiment in which the second operating member has been moved to an operated position, while the first operating member remains in the rest position.

Referring primarily to FIGS. 3, 19 and 20, the second operating member 26 will be discussed in more detail. Here in the illustrated embodiment, the second operating member 26 is pivotally mounted on the bolt 46 to pivot about the first axis A1. A fourth biasing element 80 is provided between the first and second operating members 24 and 26 so that the first and second operating members 24 and 26 are return to the rest positions after being operated and released by the user. Here, the fourth biasing element 80 is a flat coil torsion spring that is coiled about the bolt 46 with a first end attached to the user operating part 70 of the first operating member 24 and a second end attached to the second operating member 26. In this way, the first operating member 24 is biased in the second direction D2 about the first pivot axis A1, while the second operating member 26 is biased in the first direction D1 about the first pivot axis A1. In other words, the first and second operating members 24 and 26 are biased in opposite directions to their rest positions. Thus, the fourth biasing element 80 functions as a return spring for returning the first and second operating members 24 and 26 from the operated position back to the rest position. As a result, the first and second operating members 24 and 26 are trigger members that return to their rest position upon being operated and released.

As seen in FIGS. 19 and 20, the second operating member 26 includes a pulling pawl 82 that engages one of the pulling teeth 32c and moves the positioning member 32 in the second direction D2 in response to movement of the second operating member 26. The pulling pawl 82 is pivotally mounted to the second operating member 26 by a pivot pin 84. The pulling pawl 82 pivots with the second operating member 26 as the second operating member 26 moves between the rest position (FIG. 19) and the operated position (FIG. 20). During a cable pulling operation, as the second operating member 26 is operated, the positioning member 32 and the wire takeup member 40 rotate so that the positioning teeth 32b ratchet the first tooth 60a of the holding member 34. In this way, the positioning member 32 and the holding member 34 form a one-way ratchet mechanism.

A fifth biasing element 86 (only the ends are visible in FIGS. 19 and 20) is provided on the pivot pin 84 for biasing the pulling pawl 82 towards in engagement with the positioning member 32. In the illustrated embodiment, for example, the fifth biasing element 86 is a torsion spring that urges the pulling pawl 82 towards the peripheral edge of the positioning member 32. However, as seen in FIG. 19, with the second operating member 26 in the rest position, the pulling pawl 82 contacts a peripheral edge of the second stationary support plate 52, which holds the pulling pawl 82 out of the path of the pulling teeth 32c of the positioning member 32. In particular, a tooth 82a of the pulling pawl 82 contacts the peripheral edge of the positioning member 32 while the second operating member 26 is in the rest position. Once the second operating member 26 is moved from the rest position, the tooth 82a of the pulling pawl 82 rides off the peripheral edge of the second stationary support plate 52 and engages one of the pulling teeth 32c of the positioning member 32 due to the urging force of the fifth biasing element 86 on the pulling pawl 82. The tooth 82a of the pulling pawl 82 engages one of the pulling teeth 32c of the positioning member 32 to rotate the positioning member 32 and the wire takeup member 40 together in the second direction D2 as the second operating member 26 is pivoted from the rest position to the operated position. This rotation of the wire takeup member 40 in the second direction D2 pulls the inner wire 16a into the housing 18.

Figure 21:
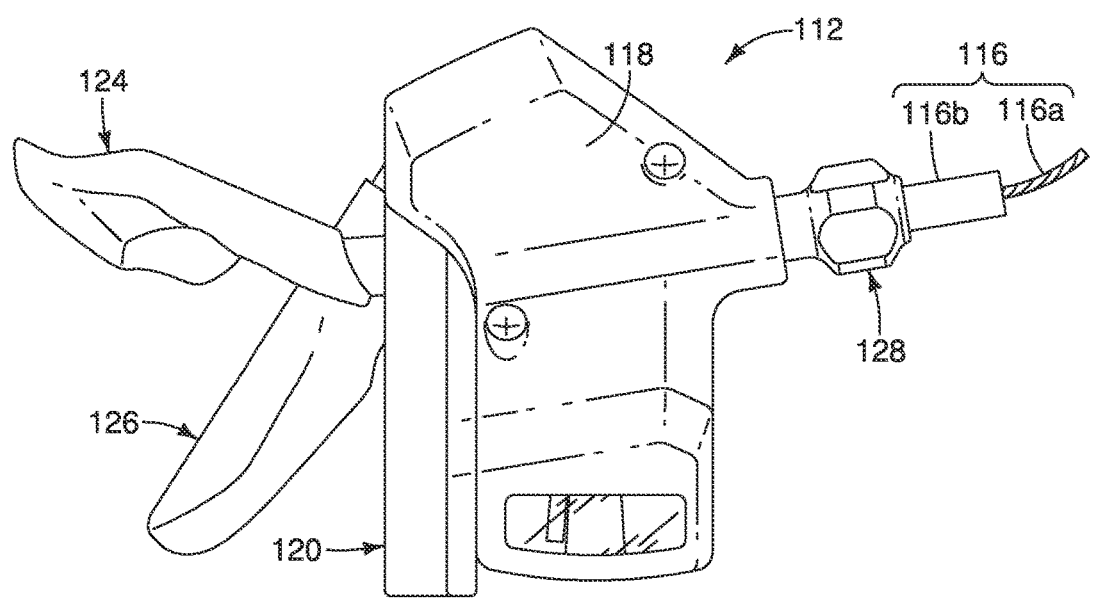
FIG. 21 is a top plan view of a bicycle operating device in accordance with a second embodiment.
Figure 22:
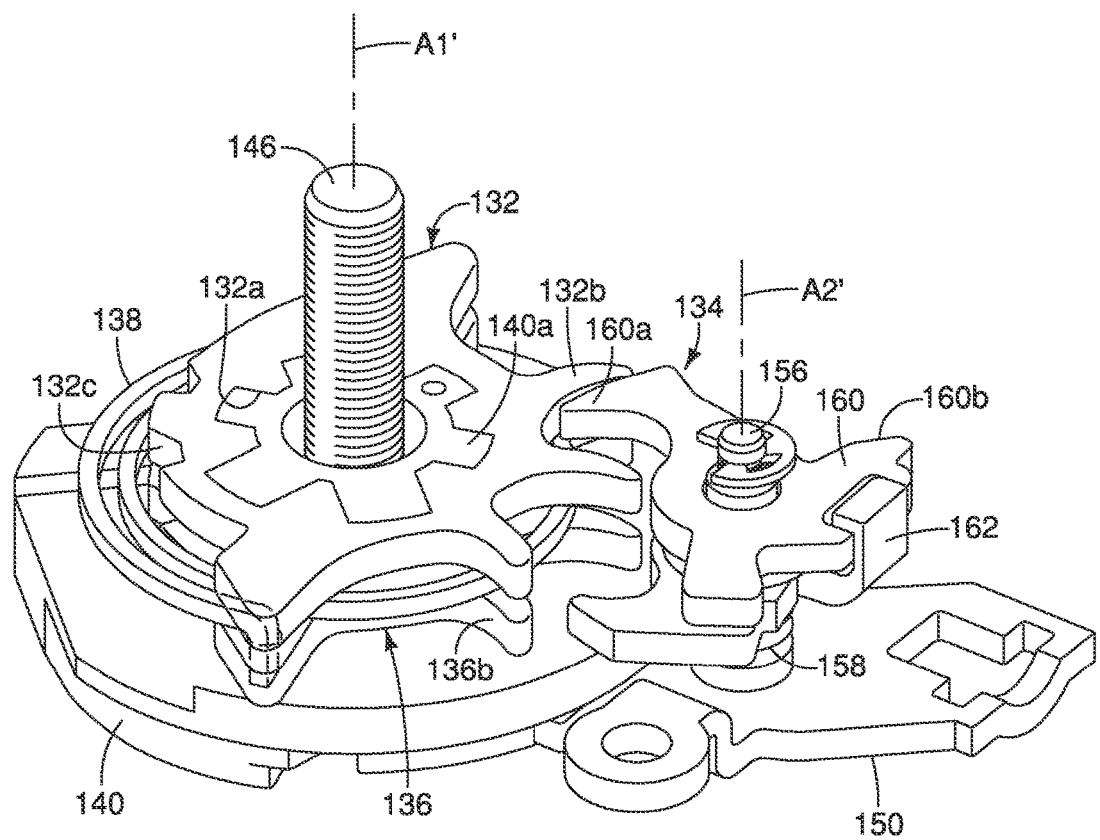
FIG. 22 is an enlarged perspective view of selected parts of the cable position maintaining arrangement of the bicycle operating device in accordance with the second embodiment illustrated in FIG. 21.

Referring now to FIGS. 21 and 22, a bicycle operating device 112 in accordance with a second embodiment will now be explained. Here, the bicycle operating device 112 is configured to be mounted on a left side of the bicycle handlebar 10, and is operatively coupled to one of a gear changing device (not shown) via a control cable 116. For example, the bicycle operating device 112 is connected by the control cable 116 to a front derailleur having three operating positions. Basically, the bicycle operating devices 12 and 112 are essentially identical in operation, except that they are mirror images of each other, and they may have a different number of cable holding positions. In other words, the bicycle operating device 112 is identical to the bicycle operating device 12, except for the bicycle operating device 112 has been modified to be a mirror image and the number of gears that can be shifted has been changed. In particular, the bicycle operating device 112 has been modified to have fewer cable holding positions than the bicycle operating device 12.

In view of the similarity between the bicycle operating devices 12 and 112, the parts of the bicycle operating device 112 that are identical in function to the parts of the bicycle operating device 12 will be given the same reference numeral, but increased by "100". Also the reference characters for axes and directional arrows will be given the same reference character, but increased with a prime symbol """ added. Thus, the descriptions of the parts of the bicycle operating device 112 that are functionally identical to the bicycle operating device 12 has been omitted for the sake of brevity.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the bicycle operating device, the following directional terms "forward", "rearward", "above", "downward", "vertical", "horizontal", "below" "lateral" and "transverse" as well as any other similar directional terms refer to directions with respect to an upright bicycle equipped with the bicycle operating device on a level surface. Accordingly, these terms, as utilized to describe the bicycle operating device should be interpreted relative to an upright bicycle that is equipped with the bicycle operating device in an installed position on a level surface. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Components that are shown directly connected or contacting each other can have intermediate structures disposed between them unless specifically stated otherwise. The functions of one element can be performed by two, and vice versa unless specifically stated otherwise. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
 a base member;
 a holding member supported on the base member and movably connected to the base member between a rest position and an operated position;
 a stopping member supported on the base member and movably connected to the base member to move in a first direction, the stopping member directly engaging the holding member so that movement of the stopping member in the first direction is prevented while the holding member is in the operated position;
 a positioning member supported on the base member and movably connected to the base member to move in the first direction, the positioning member directly engaging the holding member so that movement of the positioning member in the first direction is prevented while the holding member is in the rest position, the positioning member being movable relative to the stopping member in the first direction while the holding member is in the operated position; and
 a wire takeup member fixed to the positioning member to rotate with the positioning member with respect to the base member.

2. The bicycle operating device according to claim 1, further comprising
 a first biasing element biasing the stopping member with respect to the positioning member in the first direction.

3. The bicycle operating device according to claim 2, further comprising
 a second biasing element biasing the positioning member with respect to the base member in the first direction.

4. The bicycle operating device according to claim 3, wherein
 the second biasing element having a higher biasing force than the first biasing element.

5. The bicycle operating device according to claim 1, wherein
 the positioning member includes a plurality of positioning teeth,
 the stopping member includes a plurality of stopping teeth, and
 the holding member includes a first tooth that engages one of the positioning teeth while the holding member is in the rest position and a second tooth that engages one of the stopping teeth while the holding member is in the operated position.

6. The bicycle operating device according to claim 1, wherein
 the positioning member and the stopping member are rotatably mounted on a first axis relative to the base member to move in a rotational direction that corresponds to the first direction.

7. The bicycle operating device according to claim 6, wherein
 the positioning member includes a plurality of positioning teeth,
 the stopping member includes a plurality of stopping teeth, and
 the holding member includes a first tooth that engages one of the positioning teeth while the holding member is in the rest position and a second tooth that engages one of the stopping teeth while the holding member is in the operated position, the first tooth and the second tooth being offset from each other in an axial direction of the first axis.

8. The bicycle operating device according to claim 6, further comprising
 a first biasing element biasing the stopping member with respect to the positioning member in the first direction.

9. The bicycle operating device according to claim 8, further comprising
 a second biasing element biasing the positioning member with respect to the base member in the first direction.

10. The bicycle operating device according to claim 9, wherein
 the second biasing element having a higher biasing force than the first biasing element.

11. The bicycle operating device according to claim 8, wherein
 the first biasing element is a torsion spring having a coiled portion disposed around the first axis, and located between the positioning member and the stopping member in an axial direction of the first axis.

12. The bicycle operating device according to claim 1, wherein
 the positioning member, the wire takeup member and the stopping member are rotatably mounted on a first axis relative to the base member to move in a rotational direction that corresponds to the first direction.

13. The bicycle operating device according to claim 12, wherein
the stopping member is movably mounted on the wire takeup member to rotate with respect to the wire takeup member and the positioning member about the first axis.

14. The bicycle operating device according to claim 1, wherein
the holding member is configured to pivot about an axis, and is biased to the rest position.

15. The bicycle operating device according to claim 1, further comprising
a first operating member operatively coupled to the holding member to move the holding member from the rest position to the operated position in response to movement of the first operating member with respect to the base member.

16. The bicycle operating device according to claim 15, further comprising
a second operating member operatively coupled to the positioning member to rotate the positioning member in a second direction, which is opposite the first direction.

17. The bicycle operating device according to claim 16, wherein
the positioning member includes a plurality of pulling teeth, and
the second operating member includes a pulling pawl that engages one of the pulling teeth and moves the positioning member in the second direction in response to movement of the second operating member.

18. The bicycle operating device according to claim 1, wherein
an absorber disposed between the positioning member and the stopping member to absorb an impact shock and noise of the stopping member occurring by the positioning member moving relative to the stopping member in the first direction as a result of the holding member being moved from the rest position to the operated position.

* * * * *